US005596475A

United States Patent [19]

Figueiredo et al.

[11] Patent Number: 5,596,475

[45] Date of Patent: Jan. 21, 1997

[54] PROTECTOR DEVICE

[75] Inventors: Antonio A. Figueiredo, Belleville; Adam S. Kane, Morristown, both of N.J.

[73] Assignee: Lucent Technologies Inc., Murray Hill, N.J.

[21] Appl. No.: 497,489

[22] Filed: Jun. 30, 1995

[51] Int. Cl.$^{6}$ .......... H02H 1/04

[52] U.S. Cl. .......... 361/119; 361/124; 361/824

[58] Field of Search .......... 361/119, 56, 91, 361/111, 117–118, 124, 824; 439/922; 379/331

[56] References Cited

U.S. PATENT DOCUMENTS

| | | | |
|---|---|---|---|
| 4,171,857 | 10/1979 | Forberg et al. . | |
| 4,283,103 | 8/1981 | Forberg et al. . | |
| 4,305,109 | 12/1981 | Schilling et al. | 361/119 |
| 4,313,147 | 1/1982 | Uchida et al. | 361/119 |
| 4,642,723 | 2/1987 | Achtnig et al. . | |
| 5,248,953 | 9/1993 | Hönl . | |
| 5,299,088 | 3/1994 | Hönl et al. | 361/119 |
| 5,341,269 | 8/1994 | Hayward et al. | 361/119 |
| 5,450,269 | 9/1995 | Hsieh | 361/119 |
| 5,475,356 | 12/1995 | Kasahara | 337/31 |

OTHER PUBLICATIONS

U.S. Patent Application of Figueiredo et al., Serial No. 08/442,898, filed May 17, 1995.

U.S. Patent Application of Conorich et al., Serial No. 08/442,862, filed May 17, 1995.

U.S. Patent Application of Baggett et al., Serial No. 08/442,866, filed May 17, 1995.

U.S. Patent Application of Baggett et al., Serial No. 08/442,863, filed May 17, 1995.

*Primary Examiner*—Brian K. Young
*Assistant Examiner*—Michael J. Sherry
*Attorney, Agent, or Firm*—Lester H. Birnbaum

[57] ABSTRACT

Disclosed is a voltage and current protector device designed for connecting blocks with a high density of contacts. Thermal overload protection is provided through a special ground connector with one end mounted over the surge protector element rather than through the normal ground pin of the element. The ground connector at its other end is shaped into a detent for capturing the ground bar of the connecting block.

15 Claims, 3 Drawing Sheets

PROTECTOR DEVICE

BACKGROUND OF THE INVENTION

This invention relates to current and/or voltage protectors for inserting into a connecting block.

Connecting blocks are used in telecommunications systems for providing electrical connection at central offices and other locations between incoming and outgoing cables and to provide a cross-connection capability. Such connecting blocks also normally include voltage and current limiting protection devices to prevent damage to the circuits connected to the block. (See, e.g., U.S. Pat. Nos. 4,171,857 and 4,283,103 issued to Forberg et al.)

The protectors usually include a voltage surge protector element, such as a gas tube, current limiting devices, such as positive temperature coefficient (PTC) resistors, a ground electrode, and some form of thermal overload protection which short circuits the protector to ground in the event that any heat generated by the protector becomes excessive. The elements are typically mounted on a printed circuit board. (See, e.g., U.S. Pat. No. 5,299,088 issued to Hönl et al.) The thermal overload protection is usually triggered by the melting of one or more solder pellets which brings a ground contact into electrical contact with the electrodes of the surge element. (See also U.S. Pat. No. 5,248,953 issued to Hönl and U.S. Pat. No. 4,642,723 issued to Achtnig et al.)

Such connectors perform satisfactorily. However, recently, connecting blocks have been proposed with short distances between adjacent contact pairs. (See, e.g., U.S. patent application of Conorich et al., Ser. No. 08/442,862, filed May 17, 1995, and assigned to the present assignee.) Such short distances require smaller protectors, which are difficult to achieve considering all the elements needed for such a protector.

SUMMARY OF THE INVENTION

The invention is a protector device including a housing and adapted for insertion in a connecting block. The device comprises a voltage surge protector element having a pair of biasing electrodes and a ground electrode mounted within a housing. The device further includes a ground connector comprising an elongated conductive member electrically contacting the ground electrode and having an end portion formed into a detent which is aligned with an opening in the housing so that the end portion is adapted to receive and retain a ground bar on the connecting block. The connector is insulated from the biasing electrodes. A fusible element is formed on the protector element and mounted with respect to the ground connector so that the ground connector will also contact the biasing electrodes when the fusible element melts due to the temperature of the protector element reaching a predetermined value.

BRIEF DESCRIPTION OF THE DRAWING

These and other features of the invention are delineated in detail in the following description. In the drawing.

It will be appreciated that, for purposes of illustration, these figures are not necessarily drawn to scale.

DETAILED DESCRIPTION

Figure 1:
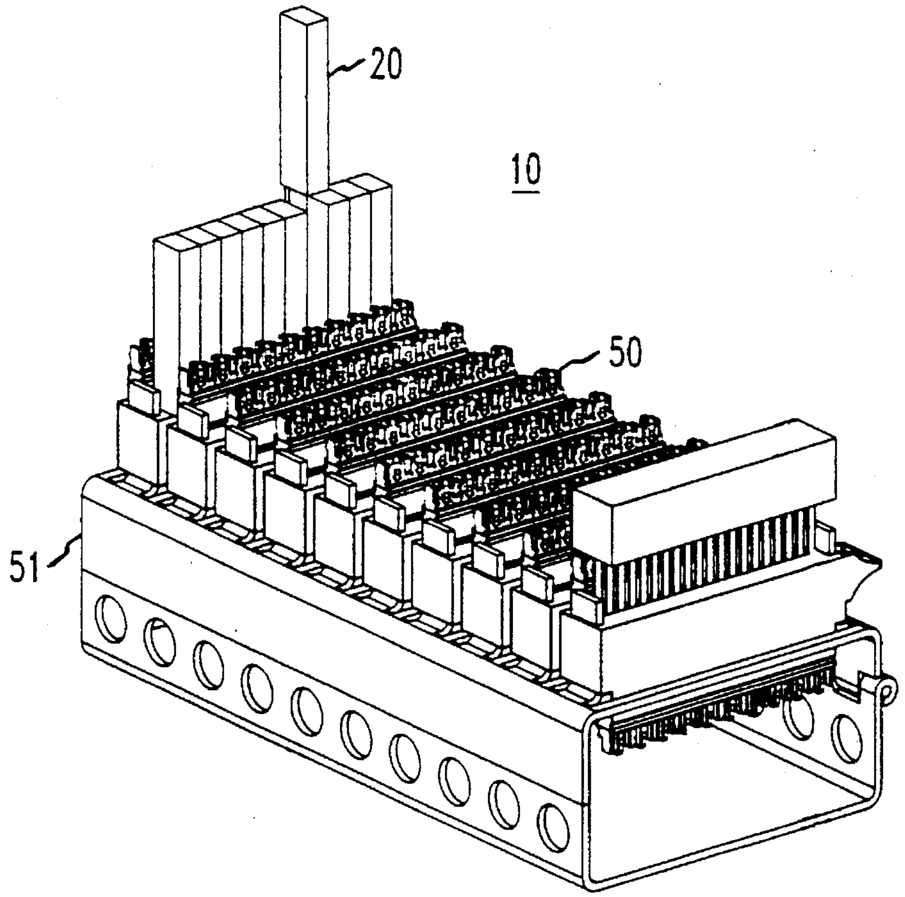
FIG. 1 is a perspective view of a connecting block with a plurality of protector devices inserted therein.
Figure 2:
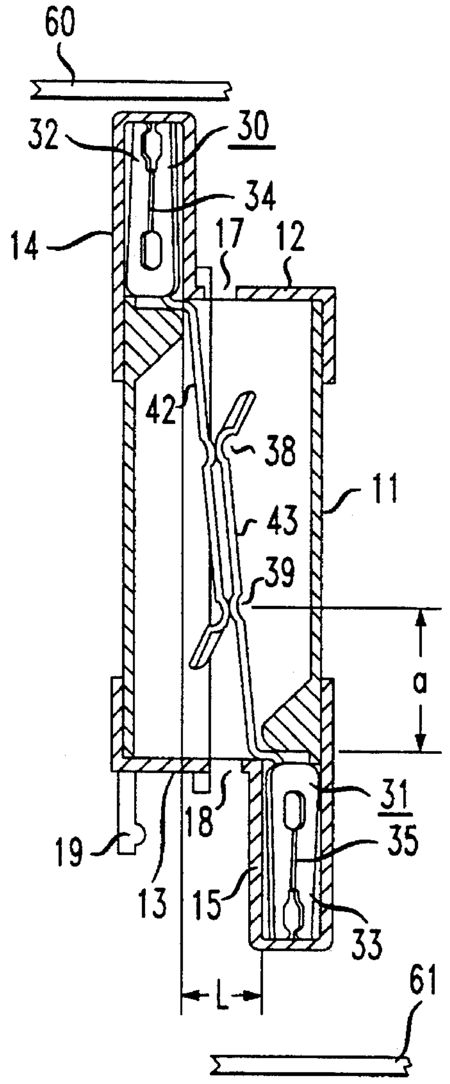
FIG. 2 is a cross-sectional view of one of the modules of the connecting block of FIG. 1 without a protector inserted therein.

FIGS. 1 and 2 illustrate one type of connecting block, 10, which may utilize the protector devices, e.g., 20, in accordance with the invention. The connecting blocks are described in more detail in U.S. patent applications of Baggett et al., Ser. Nos. 08/442,866 and 08/442,863, filed May 17, 1995, and Figueiredo et al., Ser. No. 08/442,898, filed May 17, 1995, which are incorporated by reference herein.

The connecting block, 10, includes a plurality of connector modules, e.g., 50, which are inserted into a hinged mounting bracket, 51. As illustrated in FIG. 2, each module includes an insulating housing having a rectangular-shaped body portion, 11, with insulating caps, 14 and 15, a portion of which define a top surface, 12, and bottom surface, 13, respectively. A row of insulation displacement contacts, e.g., 30, extends through the top surface, 12, and a row of insulation displacement contacts, e.g., 31, extends through the bottom surface, 13. Each contact, 30 and 31, includes an end portion, 32 and 33, protruding through the surface, the end portions having an insulation-piercing slit, 34 and 35. Each end portion, 32 and 33, is capable of receiving a wire, 60 and 61, for purposes of providing electrical connection thereto. Each contact also includes a stem portion, 42 and 43, which is housed in the body portion, 11, and makes contact with a corresponding contact in the other row, desirably, at two points, 38 and 39, to electrically connect the wires, 60 and 61, coupled to corresponding contacts, 30 and 31, in the two rows.

Figure 3:
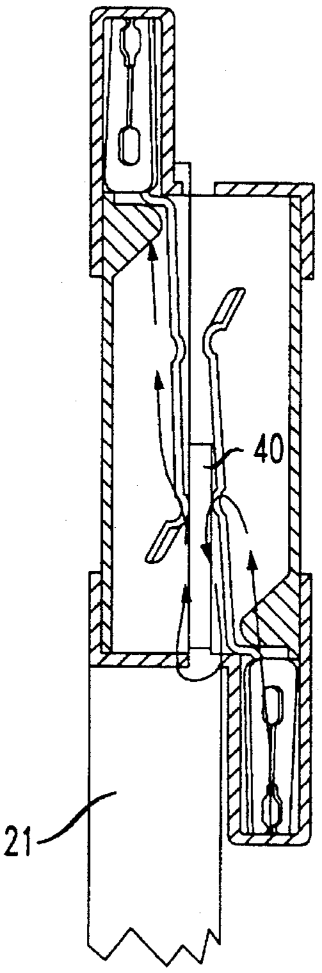
FIG. 3 is a cross-sectional view of the same module with a protector device inserted therein.

The contact points, 38 and 39, are aligned with respective slots, 17 and 18, in the top and bottom surfaces, 12 and 13, to permit insertion of leads from protectors or other elements mounted on the top or bottom surfaces. For example, FIG. 1 shows a row of protector devices, 20, in accordance with the invention mounted to the top surface of the block, while FIG. 3 illustrates a single protector device, 21, mounted to the bottom surface of the block. It will be noted that the protector, 21, is electrically connected to the stem portions of the two contacts, 30 and 31, as well as to the two adjacent contacts (not shown) in the row by means of a lead, 40, which has its two major surfaces insulated from each other so that current is forced to flow through the protector device in the manner illustrated by the arrows. Further, the protector device is electrically coupled to a ground bar, 19 of FIG. 2, on the surface of the block so that excess current and voltage can be diverted to ground.

Figure 4:
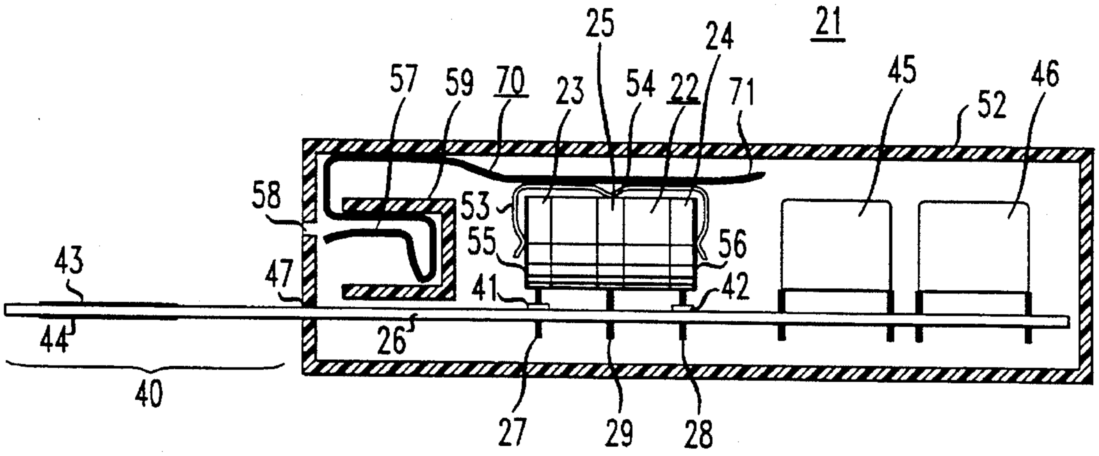
FIG. 4 is a side, cross-sectional view of a protector device in accordance with one embodiment of the invention.

As illustrated in FIG. 4, the protector device, 21, in accordance with one embodiment includes a voltage surge protector element, 22, such as a standard gas tube protector. The element, 22, includes a pair of biasing electrodes, 23 and 24, at either end of the tube, and a ground electrode, 25, at the center. The tube is through-hole mounted to a printed circuit board, 26, by soldering pins, 27–29, connected to the tube electrodes, 23–25, respectively. The pins, 27 and 28, connected to the biasing electrodes, 23 and 24, are electrically coupled to conductive pads, 41 and 42, on the circuit board so that the electrodes are electrically coupled to the contact pads, e.g., 43 or 44, on the lead portion, 40, which are on the surface of the circuit board, 26. The pin, 29, coupled to the ground electrode, 25, however, is electrically isolated from other components or conductive paths on the board.

The voltage surge protector element, 22, is electrically coupled in series to a pair of positive temperature coefficient (PTC) resistors, 45 and 46, which are also through-hole mounted by soldering to the printed circuit board, 26. The surge protector element, 22, and PTC resistors, 45 and 46, are protected by an insulating housing, 52, such as plastic, which encloses those components and a portion of the board, 26. A portion, 40, of the board, 26, previously referred to as the lead portion, protrudes through an opening, 47, in the housing, 52, to permit insertion of said lead portion into the connecting block as illustrated in FIG. 3.

Attached to the surge protector element, 22, is a generally C-shaped conductive clamp, 53. The center of the clamp, 53, includes a dimpled portion, 54, which makes electrical and mechanical contact with the ground electrode, 25. The ends of the clamp are in mechanical contact with insulating fusible layers, 55 and 56, which are deposited on the biasing electrodes, 23 and 24, respectively. The insulating layers, 55 and 56, are preferably made of a material such as Mylar®, which has a melting point of less than 260 degrees C with a thickness in the range 0.025 to 0.076 mm. The clamp is attached to the element, 22, by spot welding.

Electrically coupled to the clamp, 53, is a ground connector, 70, which can be a thin metallic sheet having approximately the same width as the housing, 52. For example, the connector, 70, can be made of beryllium-copper with a thickness in the range 0.25 to 0.5 mm. The sheet is shaped to form an arcuate portion, 71, at one end which mechanically contacts the clamp, 53, and is also wedged between the clamp and the housing, 52. The other end of the sheet is shaped into a detent, 57, which is aligned with an opening, 58, in the housing, 52, so that when the lead, 40, is inserted into the connecting block as shown in FIG. 3, the detent, 57, will receive and hold the ground bar, 19 of FIG. 2, with a "clicking" noise so that the craftsperson knows the protector device is fully inserted. The detent can be held in place by an essentially C-shaped projection, 59, which is attached to or integral with the back surface of the housing, 52. If desired, the detent can include a hole (not shown) for receiving a dimpled portion in the ground bar (19 of FIG. 2)

During normal operation, current will be conducted in the direction illustrated in FIG. 3 with the surge protector element, 22, being non-conductive. Excess current will be prevented by the changing resistance of the PTC resistors in accordance with known techniques. When the voltage appearing on the biasing electrodes, 23 and 24, reaches a threshold value, the tube, 22, will conduct current to the ground electrode 25, through the clamp, 53, and the connector, 70, to the ground bar, 19, of the connecting block so that protection from voltage surges is provided. It will be appreciated that in the usual protector device, excess voltage would be shunted through the ground pin, 29. However, applicants have discovered that by electrically isolating the ground pin and providing the ground path through connector 70 instead, the circuit board, 26, can be made narrower (typically 6.1 mm) so that the device can fit within the connecting module, 50, having very narrow spaces between adjacent contacts.

Further, in the event of thermal overload, the insulating films, 55 and 56, will melt, thereby bringing the ends of the C-shaped clamp into mechanical and electrical contact with the biasing electrodes 23 and 24. Since the clamp is coupled to ground through the connector, 70, the entire device would be short circuited, preventing any thermal damage to the circuits coupled to the connecting block. Since the connector, 70, acts to prevent both excess voltage and thermal overload, again, the protector device can be made smaller.

Figure 5:
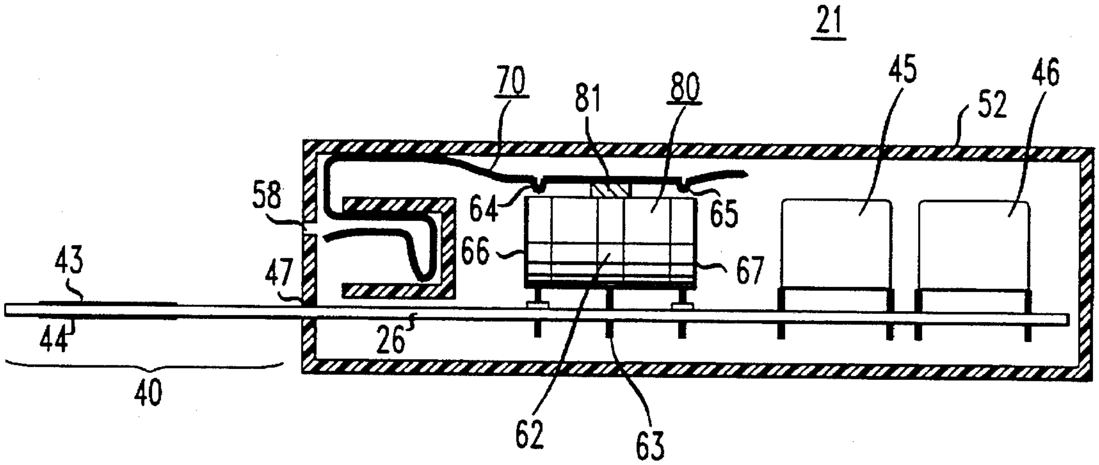
FIG. 5 is a side, cross-sectional view of a protector device in accordance with a further embodiment of the invention.

FIG. 5 illustrates an alternative embodiment where elements similar to those in FIG. 4 have been similarly numbered. Here, the gas tube, 22, has been replaced by a solid state voltage protector element, 80. In place of the clamp, 53, is a fusible solder pellet, 81, which is deposited on the ground electrode, 62, of the voltage protector element. Again, the pin, 63, coupled to the Found electrode, 62, is electrically isolated. In this embodiment, excess voltages will be shunted through the pellet and connector, 70, to the ground bar, 19, of the connecting block. It will be noted that the connector, 70, in this embodiment has two dimpled portions, 64 and 65, which are positioned above but spaced from the biasing electrodes, 66 and 67, respectively. In the event of thermal overload, the pellet, 81, will melt, causing the dimpled portions, 64 and 65 to electrically and mechanically contact their respective biasing electrodes, 66 and 67, to short out the device through the connector 70. Again, since the ground pin is isolated, and the connector, 70, is used for both voltage and thermal overload protection, the protector device can be made smaller.

The invention claimed is:

1. A protector device adapted for insertion in a connecting block comprising:

a housing;

a voltage surge protector element mounted within the housing and having a pair of biasing electrodes and a ground electrode;

a ground connector comprising an elongated conductive member electrically contacting the ground electrode and having an end portion formed into a detent which is aligned with an opening in the housing so that the end portion is adapted to receive and retain a ground bar on the connecting block, the said connector being insulated from the biasing electrodes; and a fusible element formed on the protector element and being mounted with respect to the ground connector such that the ground connector will also contact the biasing electrodes when the fusible element melts due to the temperature of the protector element reaching a predetermined value.

2. The device according to claim 1 wherein the ground connector is in mechanical and electrical contact with a generally C-shaped clamp attached to the protector element, the clamp being in contact with the ground electrode and insulated from the biasing electrodes by the fusible element until the fusible element melts, the fusible element comprising insulating layers formed on the biasing electrodes.

3. The device according to claim 1 wherein the ground connector is in electrical contact with the ground electrode through the fusible element which comprises a pellet formed on the ground electrode, and the connector includes a pair of dimples spaced from the biasing electrodes until the pellet melts.

4. The device according to claim 1 wherein the protector element is mounted to a printed circuit board including conductive layers formed thereon.

5. The device according to claim 4 wherein the protector element includes a conductive pin electrically coupled to the ground electrode and mounted to the board but electrically insulated from the conductive layers on the board.

6. The device according to claim 2 wherein the connector contacts the clamp with an arcuate portion of the connector.

7. The device according to claim 1 wherein the connector comprises a thin metal sheet.

8. The device according to claim 1 wherein the housing includes a back surface and further comprising an essentially C-shaped projection on said back surface for holding the detent.

9. The device according to claim 4 and further comprising at least one positive temperature coefficient resistor mounted to the board and electrically coupled to the voltage protector element.

10. A protector device adapted for insertion in a connecting block comprising:

a housing;

a voltage surge protector element mounted within the housing and having a pair of biasing electrodes and a ground electrode;

an essentially C-shaped conductive clamp mounted to the surge protector element so as to make mechanical and electrical contact to the ground electrode;

a fusible insulating layer formed on the biasing electrodes so as to insulate the biasing electrodes from the clamp; and a ground connector having a portion electrically and mechanically contacting the clamp and having an end portion formed into a detent which is aligned with an opening in the housing so that the end portion is adapted to receive and retain a ground bar on the connecting block.

11. The device according to claim 10 wherein the portion contacting the clamp comprises an arcuate portion.

12. A protector device adapted for insertion in a connecting block comprising:

a housing;

a voltage surge protector element mounted within the housing and having a pair of biasing electrodes and a ground electrode;

a fusible element mounted to the ground electrode; and a ground connector having a portion electrically and mechanically contacting the fusible element, the portion including dimples which are spaced from the biasing electrodes, the connector further including an end portion formed into a detent which is aligned with an opening in the housing so that the end portion is adapted to receive and retain a ground bar on the connecting block.

13. The device according to claim 10 or 12, wherein the ground connector is a thin metal sheet.

14. The device according to claim 10 or 12 wherein the surge protector element is mounted to a printed circuit board and the biasing electrodes are electrically coupled to conductive pads on the board but the ground electrode is insulated from any pads on the board.

15. The device according to claim 12 wherein the fusible element is a solder pellet.

* * * * *